(12) United States Patent
Seki et al.

(10) Patent No.: US 12,441,474 B2
(45) Date of Patent: Oct. 14, 2025

(54) ENERGY RECOVERY DEVICE FOR AIRCRAFT

(71) Applicant: IHI Corporation, Tokyo (JP)

(72) Inventors: Naoki Seki, Tokyo (JP); Hirotaka Sugawara, Tokyo (JP); Yasunori Nihei, Tokyo (JP); Hitoshi Oyori, Tokyo (JP)

(73) Assignee: IHI Corporation, Tokyo (JP)

( * ) Notice: Subject to any disclaimer, the term of this patent is extended or adjusted under 35 U.S.C. 154(b) by 444 days.

(21) Appl. No.: 17/231,155

(22) Filed: Apr. 15, 2021

(65) Prior Publication Data

US 2021/0229817 A1    Jul. 29, 2021

Related U.S. Application Data

(63) Continuation of application No. PCT/JP2019/026775, filed on Jul. 5, 2019.

(30) Foreign Application Priority Data

Oct. 18, 2018    (JP) ................... 2018-196361

(51) Int. Cl.
*B64D 13/08*    (2006.01)
*B64D 13/02*    (2006.01)
*B64D 13/06*    (2006.01)

(52) U.S. Cl.
CPC ............ *B64D 13/08* (2013.01); *B64D 13/02* (2013.01); *B64D 2013/0644* (2013.01); *B64D 2013/0648* (2013.01)

(58) Field of Classification Search
CPC ............ B64D 13/08; B64D 13/02; B64D 2013/0644; B64D 2013/0648
See application file for complete search history.

(56) References Cited

U.S. PATENT DOCUMENTS

| | | | |
|---|---|---|---|
| 3,711,044 A * | 1/1973 | Matulich ............... | B64D 13/06 454/72 |
| 4,419,926 A | 12/1983 | Cronin et al. | |
| 5,253,484 A * | 10/1993 | Corman ................ | B64D 13/00 62/239 |
| 5,701,755 A * | 12/1997 | Severson ............... | B64D 13/00 62/88 |
| 6,283,410 B1 * | 9/2001 | Thompson ............. | B64D 41/00 454/71 |
| 6,845,627 B1 * | 1/2005 | Buck ...................... | F25D 17/02 62/130 |
| 9,669,936 B1 | 6/2017 | Fiterman et al. | |
| 10,919,638 B2 | 2/2021 | Hiller | |

(Continued)

FOREIGN PATENT DOCUMENTS

| JP | 2013-538153 A | 10/2013 |
|---|---|---|
| JP | 2014-533624 A | 12/2014 |

(Continued)

*Primary Examiner* — Gordon A Jones
(74) *Attorney, Agent, or Firm* — Oblon, McClelland, Maier & Neustadt, L.L.P.

(57) ABSTRACT

An energy recovery device for an aircraft includes: a turbine that is provided between a cabin of the aircraft and an opening for discharging cabin discharge air from the cabin to the outside of the aircraft and is operated by only the cabin discharge air; and a power generator that is driven by the turbine.

7 Claims, 5 Drawing Sheets

(56) References Cited

U.S. PATENT DOCUMENTS

| | | | |
|---|---|---|---|
| 2003/0052652 A1* | 3/2003 | Andres | F02C 6/08 |
| | | | 322/28 |
| 2013/0151039 A1 | 6/2013 | Haillot | |
| 2013/0271915 A1* | 10/2013 | Schult | H05K 7/20909 |
| | | | 62/244 |
| 2014/0290287 A1 | 10/2014 | Houssaye | |
| 2014/0326135 A1 | 11/2014 | Massey et al. | |
| 2014/0331857 A1 | 11/2014 | Massey et al. | |
| 2016/0009409 A1* | 1/2016 | Rideau | B64D 41/00 |
| | | | 290/44 |
| 2017/0086335 A1* | 3/2017 | Morioka | H05K 7/20136 |
| 2018/0287482 A1* | 10/2018 | Schult | H02M 1/14 |
| 2022/0348335 A1 | 11/2022 | Ho et al. | |

FOREIGN PATENT DOCUMENTS

| | | | |
|---|---|---|---|
| JP | 2015-500162 A | 1/2015 | |
| JP | 2016-508466 A | 3/2016 | |
| WO | WO-9912810 A1 * | 3/1999 | B64D 13/06 |
| WO | WO 2016/035462 A1 | 3/2016 | |

* cited by examiner

ENERGY RECOVERY DEVICE FOR AIRCRAFT

CROSS REFERENCE TO RELATED APPLICATIONS

The present application is a continuation application of International Application No. PCT/JP2019/026775, filed on Jul. 5, 2019, which claims priority to Japanese Patent Application No. 2018-196361, filed on Oct. 18, 2018. The contents of these applications are incorporated herein by reference in their entirety.

TECHNICAL FIELD

The present disclosure relates to an energy recovery device for an aircraft.

BACKGROUND ART

Patent Document 1 discloses a system for cooling an electric drive unit in an aircraft in which a heat exchanger that exchanges heat with ventilation air discharged from a cabin is disposed adjacent to the electric drive unit, an electrical blower device that suctions ventilation air from the heat exchanger is provided, and an amount of ventilation air passing through the heat exchanger is adjusted by changing a rotation speed of an electrical blower according to an amount of heat generated from the electric drive unit. Techniques associated with an air-conditioning device for an aircraft are disclosed in Patent Documents 2 to 4.

DOCUMENTS OF THE RELATED ART

Patent Document

[Patent Document 1]
  PCT International Publication No. WO2016/035462
[Patent Document 2]
  Published Japanese Translation No. 2015-500162 of the PCT International Publication
[Patent Document 3]
  Published Japanese Translation No. 2014-533624 of the PCT International Publication
[Patent Document 4]
  U.S. Pat. No. 4,419,926

SUMMARY

In the related art, ventilation air which has been heated while passing through a heat exchanger is discharged to the outside of an aircraft as it is. That is, in the related art, surplus energy generated in the aircraft is discarded without being effectively utilized. However, effective utilization of surplus energy of an aircraft is preferable in consideration of energy efficiency in the aircraft as a whole.

The present disclose was invented in consideration of the aforementioned circumstances and an objective thereof is to effectively utilize surplus energy of an aircraft.

In order to achieve the aforementioned objective, according to a first aspect of the disclosure, there is provided an energy recovery device for an aircraft including: a turbine that is provided between a cabin of the aircraft and an opening for discharging cabin discharge air from the cabin to the outside of the aircraft and is operated by only the cabin discharge air; and a power generator that is driven by the turbine.

A second aspect of the disclosure provides the energy recovery device for an aircraft according to the first aspect, wherein the turbine and the power generator are provided behind a pressure bulkhead of the aircraft.

A third aspect of the disclosure provides the energy recovery device for an aircraft according to the first or second aspect, wherein the opening is an outflow valve that is a constituent of a pressurization and air-conditioning system of the aircraft.

A fourth aspect of the disclosure provides the energy recovery device for an aircraft according to any one of the first to third aspects, further including a power converter that converts an output of the power generator to a DC voltage matching a DC power supply bus of the aircraft.

A fifth aspect of the disclosure provides the energy recovery device for an aircraft according to the first aspect, wherein the turbine is operated using only a total fluid of a plurality of flows of cabin discharge air discharged from the cabin.

A sixth aspect of the disclosure provides the energy recovery device for an aircraft according to any one of the first to fourth aspects, further including a cooling unit that cools an electrical instrument of the aircraft using the cabin discharge air, wherein the turbine is operated by heated discharge air discharged from the cooling unit.

A seventh aspect of the disclosure provides the energy recovery device for an aircraft according to the sixth aspect, wherein a plurality of turbines and a plurality of power generators are provided to correspond to a plurality of cooling units when a plurality of cooling units are provided.

An eighth aspect of the disclosure provides the energy recovery device for an aircraft according to the sixth aspect, wherein the cooling unit includes a heat exchanger, and the heated discharge air is the cabin discharge air which is heated and increased in temperature by cooling the electrical instrument and by heat of the electrical instrument via the heat exchanger of the cooling unit.

According to the disclosure, it is possible to realize effective utilization of surplus energy of an aircraft.

DETAILED DESCRIPTION

Hereinafter, first to fourth embodiments of the present disclosure will be described with reference to the accompanying drawings.

First Embodiment

Figure 1:
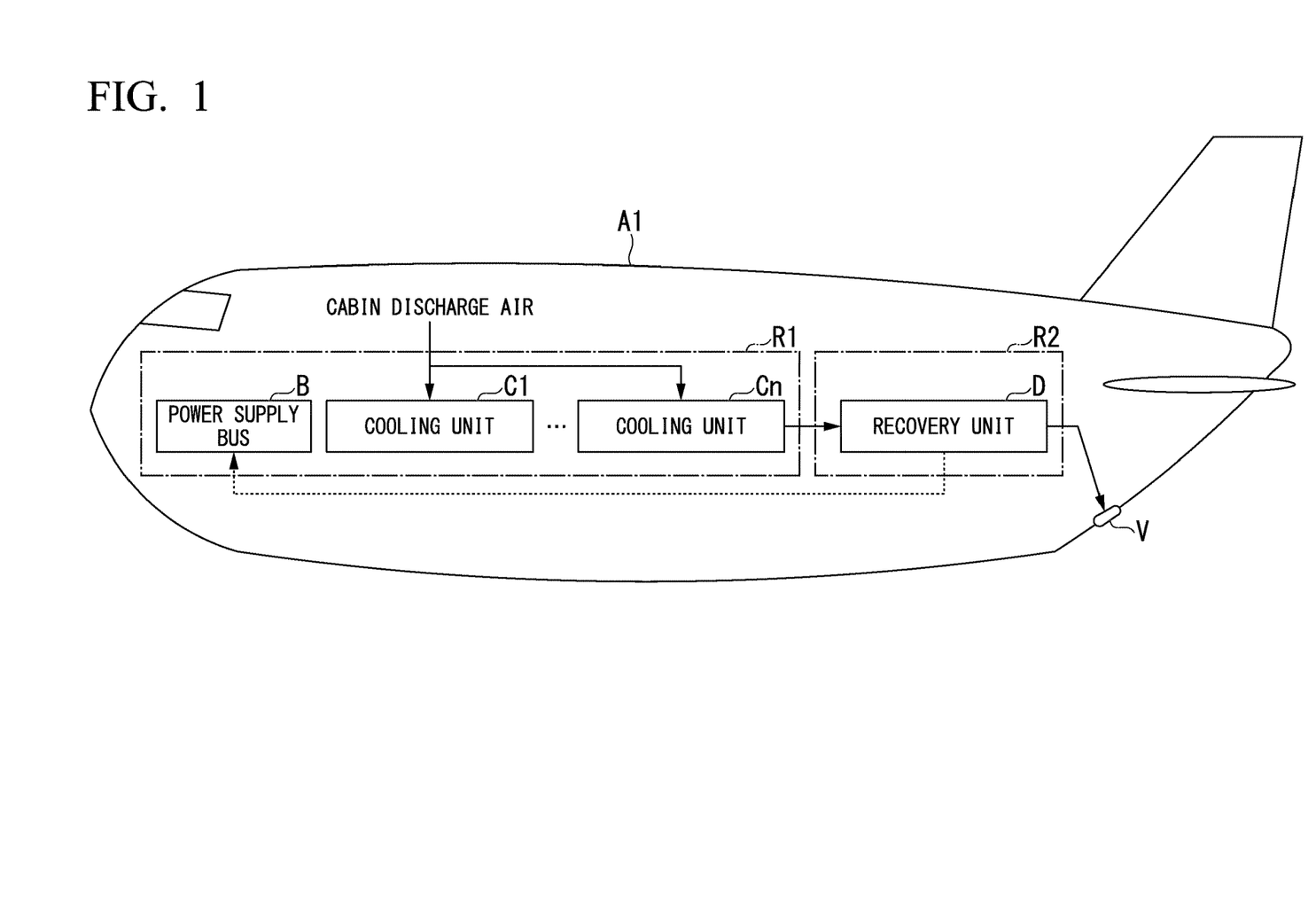
FIG. 1 is a block diagram showing a functional configuration of an energy recovery device for an aircraft according to a first embodiment of the disclosure.

First, an energy recovery device for an aircraft according to a first embodiment of the disclosure will be described below. The energy recovery device for an aircraft is provided in an aircraft A1 as shown in FIG. 1. More specifically, the energy recovery device for an aircraft is provided as an accessory to a pressurization and air-conditioning system (that is not shown) of the aircraft A1 and is provided as a recovery unit D in the aircraft A1.

Here, an outflow valve V is provided in a rear part of an airframe of the aircraft A1. The outflow valve V constitutes the pressurization and air-conditioning system and is an opening that discharges air (i.e., cabin discharge air) discharged from the cabin to the outside of the aircraft. More specifically, the outflow valve V is also a flow rate control valve that controls an amount of cabin discharge air discharged to the outside of the aircraft by a degree of opening thereof being controlled.

The pressurization and air-conditioning system adjusts a pressure (i.e., adjusts a pressurization) and a temperature of air (i.e., outside air) from the outside of the aircraft, supplies the pressure and temperature-adjusted air to the cabin, and discharges air in the cabin as cabin discharge air from the outflow valve V to the outside of the aircraft. More specifically, the pressurization and air-conditioning system performs temperature adjustment, pressure adjustment, and flow rate adjustment of a part of compressed air which is output from a dedicated compressor or which is generated in an engine (i.e., a gas turbine), supplies the compressed air into the cabin, and appropriately adjusts a pressure (i.e., a cabin pressure) in the cabin by adjusting a degree of opening of the outflow valve V to control an air flow rate passing through the valve.

First and second electrical rooms R1 and R2 that accommodate various types of electrical instruments (that is not shown) therein are provided in the aircraft A1. Out of the first and second electrical rooms R1 and R2, at least a plurality of cooling units C1 to Cn and a power supply bus B in addition to the electrical instruments are accommodated in the first electrical room R1. On the other hand, at least a recovery unit D is provided in the second electrical room R2. For example, the first electrical room R1 is provided under the floor of the cabin and the second electrical room R2 is provided in the vicinity of the outflow valve V, that is, behind the cabin.

The plurality of cooling units C1 to Cn are provided to correspond to a plurality of electrical instruments accommodated in the first electrical room R1 and include a cooling system (i.e., AACS: an autonomous air cooling system) that cools the electrical instruments through heat exchange with the cabin discharge air by introducing the cabin discharge air thereinto. This means that the cooling units C1 to Cn cool the electrical instruments through heat exchange with the cabin discharge air by introducing the cabin discharge air thereinto. The cooling units C1 to Cn discharge heated discharge air of which the temperature has been increased by heating the cabin discharge air in the course of cooling the electrical instruments to the recovery unit D. Details of such a cooling system (i.e., AACS) are described in Patent Document 1. Here, "n" denotes a value indicating a natural number.

In the first electrical room R1, a power supply device (i.e., a main power supply device) that supplies electric power to electrical loads of the aircraft A1 is provided as one of various types of electrical instruments. The power supply bus B is a power supply line that electrically connects the main power supply device to various electrical loads and is, for example, a DC power supply bus that transmits DC electric power output from the main power supply device to DC loads. An electrical load is an electronic component or an electronic circuit and a DC load is an electronic component or an electronic circuit that operates with DC electric power.

The recovery unit D is an energy recovery device for an aircraft according to the first embodiment. The recovery unit D is provided between the cooling units C1 to Cn that cool the electrical instruments using the cabin discharge air and the outflow valve V (i.e., discharge port) that discharges the cabin discharge air to the outside of the aircraft. The recovery unit D is a device that recovers fluidic energy from heated discharge air supplied from the cooling units C1 to Cn as DC electric power (i.e., electrical energy).

Figure 2:
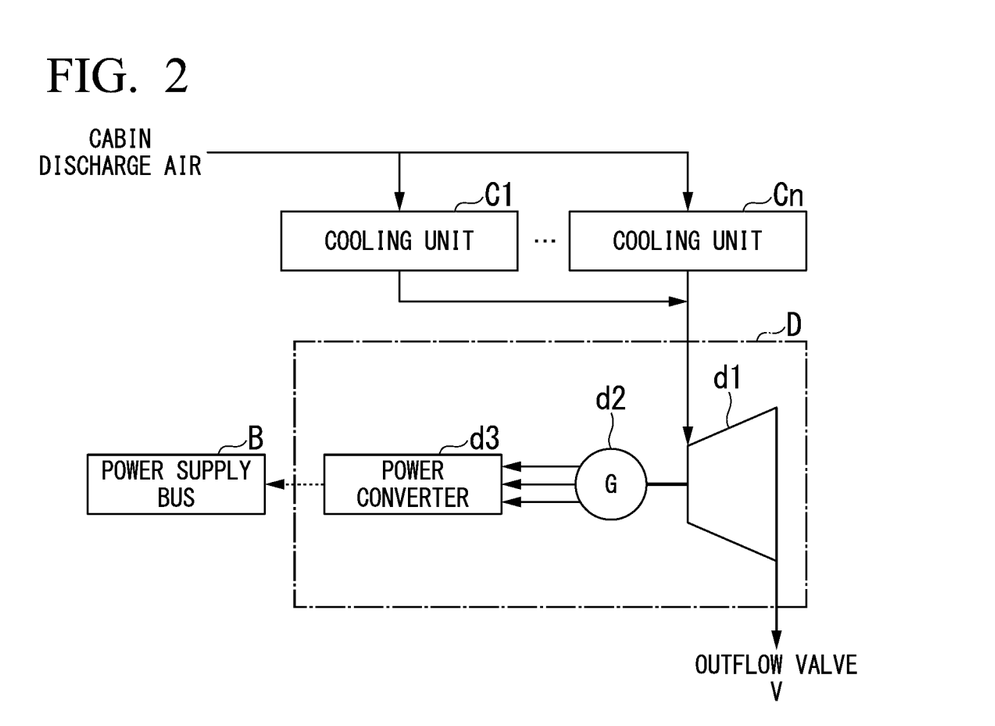
FIG. 2 is a block diagram showing a detailed configuration of the energy recovery device for an aircraft according to the first embodiment of the disclosure.

The recovery unit D (i.e., the energy recovery device for an aircraft) includes a recovery turbine d1, a power generator d2, and a power converter d3 as shown in FIG. 2. The recovery unit D may further include the cooling units C1 to Cn. The turbine d1 is a rotating machine that is provided between the cabin and the outflow valve V (i.e., a discharge port) with the cooling units C1 to Cn interposed therebetween and is operated by only the cabin discharge air.

That is, the turbine d1 is not rotationally driven by a power source such as an engine but is rotationally driven by only a total fluid of the cabin discharge air discharged from the plurality of cooling units C1 to Cn, and recovers kinetic energy of the total fluid of the cabin discharge air by converting the kinetic energy to a rotational force. The total fluid of the cabin discharge air discharged from the plurality of cooling units C1 to Cn is a fluid obtained by totaling the amounts of cabin discharge air discharged from the plurality of cooling units C1 to Cn or a fluid obtained by totaling a plurality of flows of cabin discharge air discharged from the cabin. Specifically, a plurality of first flow channels and second flow channels connecting the plurality of first flow channels to the turbine d1 are provided between the cabin and the turbine d1, and a plurality of flows of cabin discharge air discharged from the cabin flow through the plurality of first flow channels, join (i.e., give a total amount), flow through the second flow channels, and are supplied to the turbine d1. The turbine d1 outputs the cabin discharge air from which power has been recovered (i.e., recovered discharge air) to the outflow valve V.

The power generator d2 is a rotating machine (i.e., an electric rotating machine) of which a rotation shaft is axially connected to the turbine d1 and which generates AC electric power by rotating with the rotational force of the turbine d1. More specifically, the power generator d2 is, for example, a three-phase AC power generator that outputs three-phase AC power and includes a stator with the number of slots and a rotor with the number of poles corresponding to the AC electric power. The power generator d2 outputs three-phase AC electric power generated in windings of the stator to the power converter d3 on the basis of electromagnetic induction of the rotor rotating with the rotational force of the turbine d1 and the fixed stator.

The power converter d3 is a power circuit that converts AC electric power input from the power generator d2 to DC electric power of a predetermined voltage (i.e., a DC voltage). The power converter d3 includes at least an inverter circuit and a step-up/down circuit. For example, when the AC electric power is three-phase AC electric power, the inverter circuit includes three switching legs that correspond to three-phase AC electric power and in which two switching elements are connected in series in each thereof. By appropriately turning on/off the switching elements of each switching leg, three-phase AC electric power including three phases (i.e., a U phase, a V phase, and a W phase) with a phase difference of 120° is converted to DC electric power of a DC voltage corresponding to the amplitude of the three-phase AC electric power.

The step-up/down circuit is a chopper circuit that converts DC electric power input from the inverter circuit to DC electric power of a DC voltage different from that of the DC electric power by switching a predetermined switching element. That is, the step-up/down circuit generates DC electric power of a DC voltage matching the voltage of the power supply bus B (i.e., a source voltage) by adjusting a duty ratio of the turning-on/off operation of the switching elements and outputs the generated DC electric power to the power supply bus B.

Time-series operations of the energy recovery device for an aircraft according to the first embodiment, that is, the recovery unit D, will be described below in detail.

When the aircraft A1 is flying, the pressurization and air-conditioning system normally operates to set the pressure and the temperature in the cabin to optimal values. That is, with operation of the pressurization and air-conditioning system, air (i.e., outside air) is normally supplied to the cabin and cabin discharge air from the cabin is normally discharged from the outflow valve V to the outside of the aircraft.

The cooling units C1 to Cn cool the electrical instruments accommodated in the first electrical room R1 using the cabin discharge air passing through the first electrical room R1 with operation of the pressurization and air-conditioning system. That is, the cabin discharge air cools the electrical instruments via the heat exchangers of the cooling units C1 to Cn, is heated and increased in temperature by heat of the electrical instruments, and is supplied as heated discharge air to the recovery unit D. In other words, the cooling units C1 to Cn include a heat exchanger and the heated discharge air is cabin discharge air which has been heated and increased in temperature by cooling the electrical instruments and by heat of the electrical instruments via the heat exchangers of the cooling units. The heated discharge air is supplied to the turbine d1.

The heated discharge air is cabin discharge air to which thermal energy has been added by passing through the first electrical room R1 and in which fluidic energy has been increased with increased kinetic energy. The heated discharge air drives the turbine d1 of the recovery unit D whiles passing through the second electrical room R2. That is, the heated discharge air serves as a working fluid for the turbine d1 and the fluidic energy thereof is recovered as a rotational force by the turbine d1.

In the recovery unit D, since the turbine d1 is axially coupled to the power generator d2, the power generator d2 is driven with the rotational force of the turbine d1 to generate AC electric power. That is, in the recovery unit D, the rotational force (i.e., kinetic energy) recovered from the heated discharge air by the turbine d1 is converted to AC electric power (i.e., electric energy) by the power generator d2. The AC electric power is converted to DC electric power of a DC voltage matching the voltage of the power supply bus B (i.e., the source voltage) by the power converter d3 of the recovery unit D and is supplied to the power supply bus B.

With the energy recovery device (i.e., the recovery unit D) for an aircraft according to the first embodiment, fluidic energy of the heated discharge air is finally recovered as electric energy and is consumed in various electrical loads. Accordingly, it is possible to effectively utilize surplus energy which is generated in the aircraft A1.

The turbine d1 in the first embodiment is not operated using power generated from a power source such as an engine but is operated using only the heated discharge air. Accordingly, the output of the power generator d2 depends on only the heated discharge air. That is, the output of the power generator d2 depends on an operating state of the pressurization and air-conditioning system which is originally provided in the aircraft A1. Accordingly, according to the first embodiment, it is possible to recover surplus energy which is generated in the aircraft A1 regardless of the operating state of the engine or the other devices.

According to the first embodiment, the heated discharge air (i.e., recovered discharge air) from which power has been recovered in the turbine d1 is supplied to the outflow valve V. Accordingly, it is possible to discharge the recovered discharge air to the outside of the aircraft without damaging aerodynamic characteristics of the airframe.

According to the first embodiment, the recovery unit D is accommodated in the second electrical room R2 which is provided separately from the first electrical room R1. Accordingly, it is possible to enhance a degree of freedom in installation of the recovery unit D.

Second Embodiment

Figure 3:
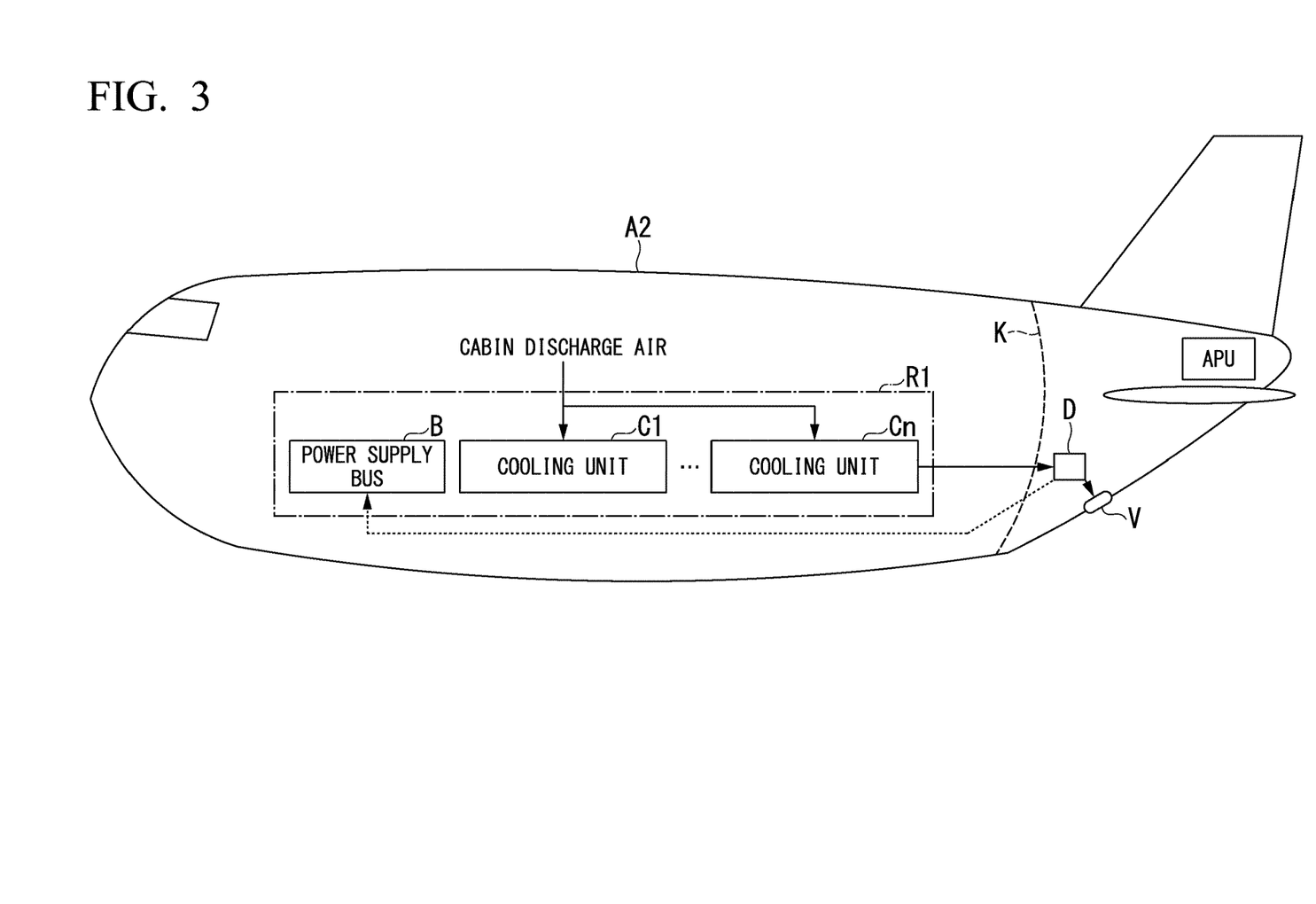
FIG. 3 is a block diagram showing a functional configuration of an energy recovery device for an aircraft according to a second embodiment of the disclosure.

An energy recovery device for an aircraft according to a second embodiment of the disclosure will be described below. The second embodiment is different from the first embodiment in an installation position of the recovery unit D (i.e., the energy recovery device for an aircraft). As well known, a pressure bulkhead K for forming a pressurization section is provided in a rear part of an airframe (i.e., behind a cabin) of an aircraft A2 as shown in FIG. 3.

The energy recovery device (i.e., the recovery unit D) for an aircraft according to the second embodiment is provided behind the pressure bulkhead K in the airframe of the aircraft A2. In an airframe of a passenger airplane, an auxiliary power unit (APU) is provided in a space behind the pressure bulkhead K. The APU is a small-sized engine for supplying compressed air, a hydraulic pressure, and electric power to constituent parts of the aircraft A2 and is used to supply compressed air or electric power to the pressurization and air-conditioning system.

The space behind the pressure bulkhead K has a relatively high degree of freedom in space and thus the recovery unit D can be easily additionally provided. In FIG. 3, a configuration in which DC electric power output from the recovery unit D is supplied to the power supply bus B, that is, a configuration in which the recovery unit D is linked to the power supply bus B, is shown. However, the recovery unit D may be linked to a power supply bus (i.e., a DC power supply bus) of the APU (i.e., auxiliary power unit according to necessity.

According to the second embodiment, the energy recovery device (i.e., the recovery unit D) for an aircraft is provided in the space behind the pressure bulkhead K. Accordingly, it is possible to very easily install the energy recovery device (i.e., the recovery unit D) for an aircraft in an existing aircraft.

Third Embodiment

Figure 4:
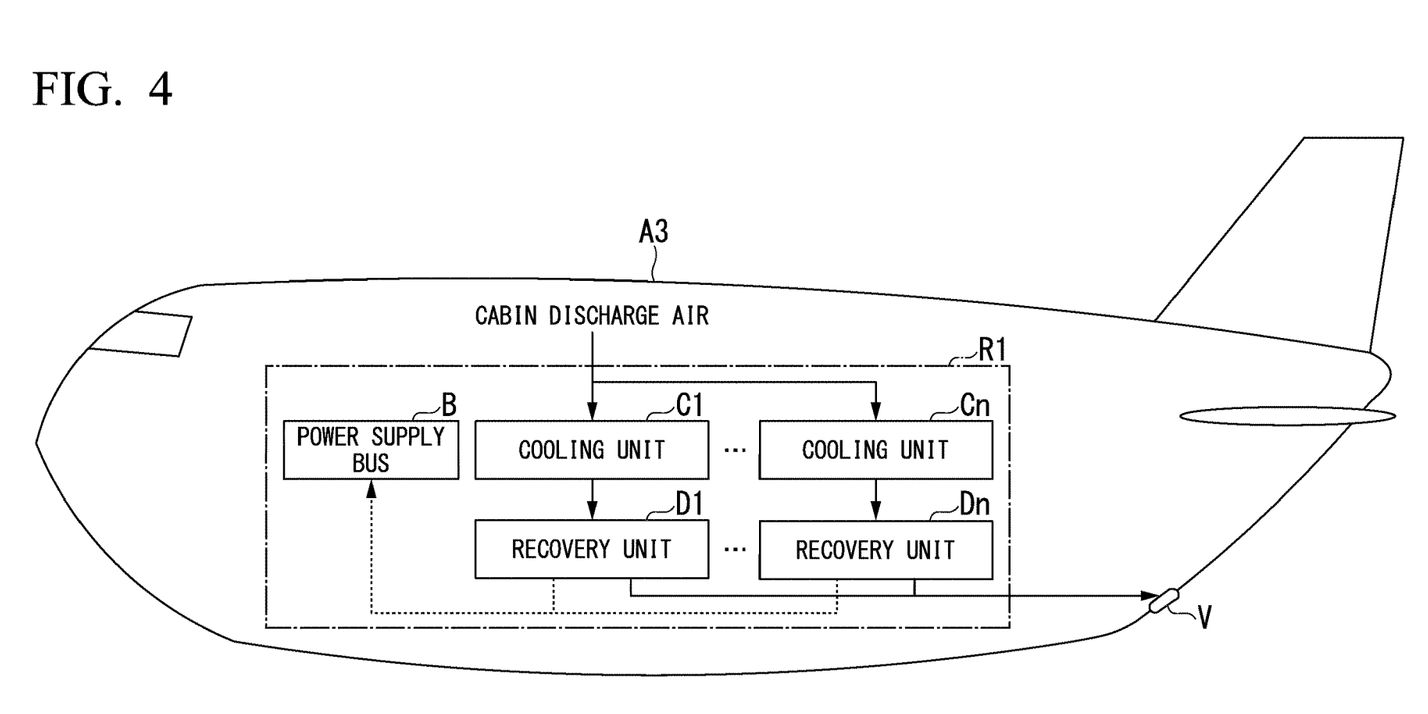
FIG. 4 is a block diagram showing a functional configuration of an energy recovery device for an aircraft according to a third embodiment of the disclosure.

An energy recovery device for an aircraft according to a third embodiment of the disclosure will be described below. The third embodiment is different from the first and second embodiments in that a plurality of recovery units D1 to Dn (i.e., energy recovery devices for an aircraft) corresponding to a plurality of cooling units C1 to Cn are provided.

That is, out of the plurality of recovery units D1 to Dn, the first recovery unit D1 recovers energy from heated discharge air which is supplied from the first cooling unit C1, the second recovery unit D2 recovers energy from heated discharge air which is supplied form the second cooling unit C2, and the n-th recovery unit Dn recovers energy from heated discharge air which is supplied from the n-th cooling unit Cn. The recovery units D1 to Dn are accommodated in the first electrical room R1 to be subsidiary to the corresponding cooling units C1 to Cn.

According to the third embodiment, the plurality of recovery units D1 to Dn are provided to correspond to the plurality of cooling units C1 to Cn. That is, the recovery units D1 to Dn of same number as the cooling units C1 to Cn are provided such that the cooling units C1 to Cn and the recovery units D1 to Dn correspond to each other in one-to-one correspondence. In other words, the turbines d1 of the same number as the cooling units C1 to Cn are provided and the power generators d2 of the same number as the cooling units C1 to Cn are provided. Accordingly, there is a likelihood that an installation space will be restricted more than in the first and second embodiments, but the recovery units D1 to Dn can be designed to be specialized for heated discharge air discharged from the cooling units C1 to Cn. Accordingly, it is possible to decrease the size of each of the recovery units D1 to Dn and to easily cope with change in performance of the cooling units C1 to Cn.

Fourth Embodiment

Figure 5:
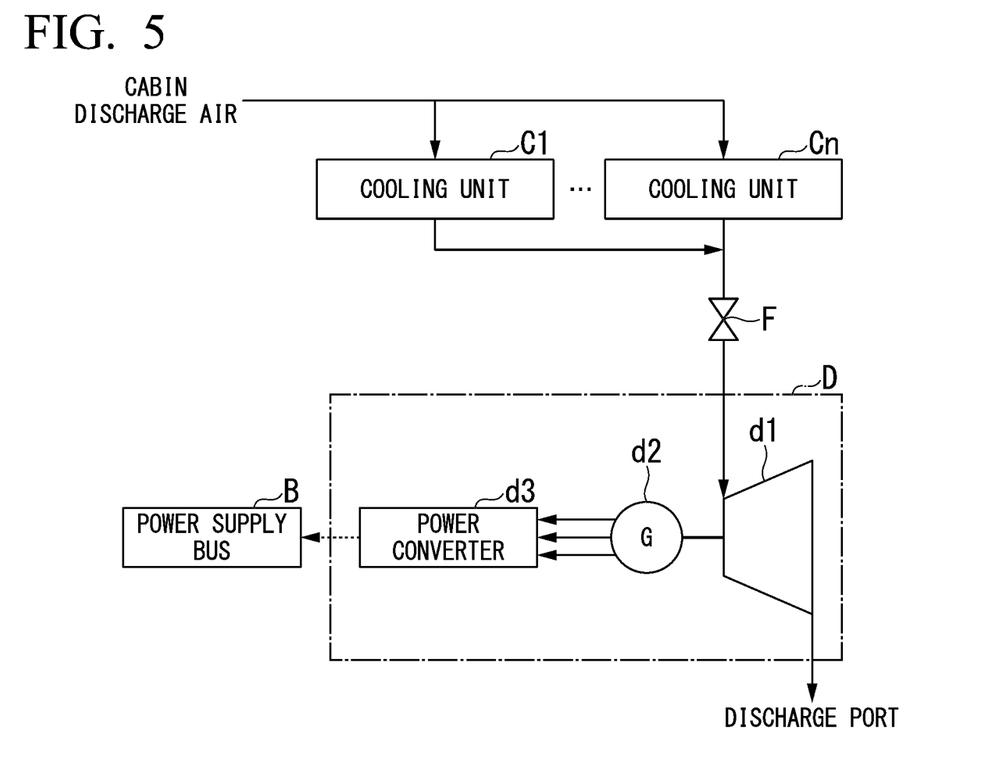
FIG. 5 is a block diagram showing a detailed configuration of an energy recovery device for an aircraft according to a fourth embodiment of the disclosure.

An energy recovery device for an aircraft according to a fourth embodiment of the disclosure will be described below. The fourth embodiment is different from the first to third embodiments in that heated discharge air (i.e., recovered discharge air) from which power has been recovered in the turbine d1 is supplied to a discharge port not having a flow rate control function. The discharge port in the fourth embodiment is an opening (i.e., a simple opening) not having a flow rate control function unlike the outflow valve V.

That is, the energy recovery device for an aircraft according to the fourth embodiment recovers power by providing a flow rate control valve F between the cooling units C1 to Cn and the turbine d1, that is, upstream from the turbine d1, as shown in FIG. and supplying heated discharge air of which a flow rate has been controlled by the flow rate control valve F to the turbine d1. Then, the recovered discharge air from which power has been recovered by the turbine d1 is supplied to the discharge port.

With the energy recovery device for an aircraft, it is possible to discharge recovered discharge air to the outside of the aircraft via the discharge port by replacing the flow rate control function which is originally provided in the outflow valve V with the flow rate control valve F. The installation position of the flow rate control valve F is not limited to upstream from the turbine d1, but may be downstream from the turbine d1.

The disclosure is not limited to the aforementioned embodiments and, for example, following modified examples can be conceivable.

(1) The aforementioned embodiments are based on the premise of installation of the plurality of cooling units C1 to Cn, but the disclosure is not limited thereto. That is, the disclosure can be applied to a pressurization and air-conditioning system not including a plurality of cooling units C1 to Cn.

(2) In the aforementioned embodiments, the power converter d3 is provided in each of the recovery units D and D1 to Dn, but the disclosure is not limited thereto. For example, AC electric power which is generated by the power generator d2 may be linked to an output of a power generator (i.e., AC electric power) which is originally provided in the aircrafts A1 to A3.

Without departing of the gist of the disclosure, an element in the aforementioned embodiments can be appropriately replaced with a known element, and the aforementioned modified examples may be appropriately combined.

INDUSTRIAL APPLICABILITY

According to the disclosure, it is possible to realize effective utilization of surplus energy of an aircraft.

What is claimed is:

1. An energy recovery device for an aircraft comprising:
a turbine that is provided between a cabin of the aircraft and an opening for discharging cabin discharge air from the cabin to outside of the aircraft;
a power generator that is driven by the turbine;
a plurality of cooling units that are provided between the cabin and the turbine, each of the plurality of cooling units including a heat conducting member, the heat conducting member being configured to exchange heat;
a plurality of first flow channels, each of the plurality of first flow channels having a first end and a second end; and
one second flow channel, the one second flow channel having a third end and a fourth end, wherein
the first end is connected with each of the plurality of cooling units,
the second end is connected with the third end,
the fourth end is connected with the turbine,
each of the plurality of cooling units is configured to cool each of a plurality of electrical instruments and heat the cabin discharge air using the heat conducting member, and discharge heated cabin discharge air to the turbine via each of the plurality of first flow channels and the second flow channel, and
the turbine is configured to rotate using only a total fluid obtained by totaling a plurality of flows of the heated cabin discharge air discharged from the plurality of cooling units.

2. The energy recovery device for an aircraft according to claim 1, wherein the turbine and the power generator are provided behind a pressure bulkhead of the aircraft.

3. The energy recovery device for an aircraft according to claim 1, wherein the opening is an outflow valve that is a constituent of a pressurization and air-conditioning system of the aircraft.

4. The energy recovery device for an aircraft according to claim 1, further comprising a power converter that converts an output of the power generator to a DC voltage matching a DC power supply bus of the aircraft.

5. The energy recovery device for an aircraft according to claim 1,
wherein in a direction in which the cabin discharge air flows,
the turbine is provided between the cabin and the opening, and
the cooling unit is provided between the cabin and the turbine.

6. The energy recovery device for an aircraft according to claim 1, wherein a rotation shaft of the power generator is axially connected to the turbine.

7. The energy recovery device for an aircraft according to claim 6,
wherein the power generator is a three-phase AC power generator, the three-phase AC power generator includes:
a rotor configured to rotate with a rotational force of the turbine;
a stator fixed; and
a stator winding, and
the power generator is configured to output a three-phase AC electric power generated in the stator winding on the basis of electromagnetic induction of the rotor and the stator.

* * * * *